(12) United States Patent
Nilsson

(10) Patent No.: US 7,913,914 B2
(45) Date of Patent: Mar. 29, 2011

(54) CONNECTOR DEVICE

(75) Inventor: Andreas Nilsson, Hassleholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 12/431,152

(22) Filed: Apr. 28, 2009

(65) Prior Publication Data

US 2010/0270378 A1  Oct. 28, 2010

(51) Int. Cl.
*G06K 7/00* (2006.01)
*H05K 5/00* (2006.01)
*H01R 39/00* (2006.01)

(52) U.S. Cl. .................. 235/486; 439/1; 361/730

(58) Field of Classification Search .............. 235/486
See application file for complete search history.

(56) References Cited

U.S. PATENT DOCUMENTS

| | | | | |
|---|---|---|---|---|
| 6,073,853 A * | 6/2000 | Odic | ............ | 235/486 |
| 6,231,394 B1 | 5/2001 | Schnell et al. | | |
| 6,581,830 B1 * | 6/2003 | Jelinek et al. | ............ | 235/441 |
| 6,947,290 B2 * | 9/2005 | Hirata | ............ | 361/741 |
| 7,497,744 B2 * | 3/2009 | Tsai | ............ | 439/862 |
| 2007/0117473 A1 | 5/2007 | Uchida et al. | | |
| 2007/0161274 A1 | 7/2007 | Tanaka et al. | | |

FOREIGN PATENT DOCUMENTS

EP  1 341 266 A2  9/2003

OTHER PUBLICATIONS

International Search Report, corresponding to PCT/EP2009/064116, mailed Feb. 5, 2010.
Written Opinion of the International Searching Authority, corresponding to PCT/EP2009/064116, mailed Feb. 5, 2010.

* cited by examiner

*Primary Examiner* — Michael G Lee
*Assistant Examiner* — Laura Gudorf
(74) *Attorney, Agent, or Firm* — Renner, Otto, Boisselle & Sklar, LLP

(57) ABSTRACT

A card connector for ejection and introduction of smart cards is disclosed for usage in a portable electronic device comprising a card reader with a resilient card connecting device for operative connection of the smart card to the card reader by introducing the smart card into the card reader or disconnection of the smart card from the card reader by withdrawing the smart card from the card reader by moving the smart card in a plane being substantially in parallel with the plane of the card reader, wherein the card connecting device is extending substantially along a plane being inclined in relation to the plane of the card reader at an angle α, wherein the angle α is not 90°.

13 Claims, 5 Drawing Sheets

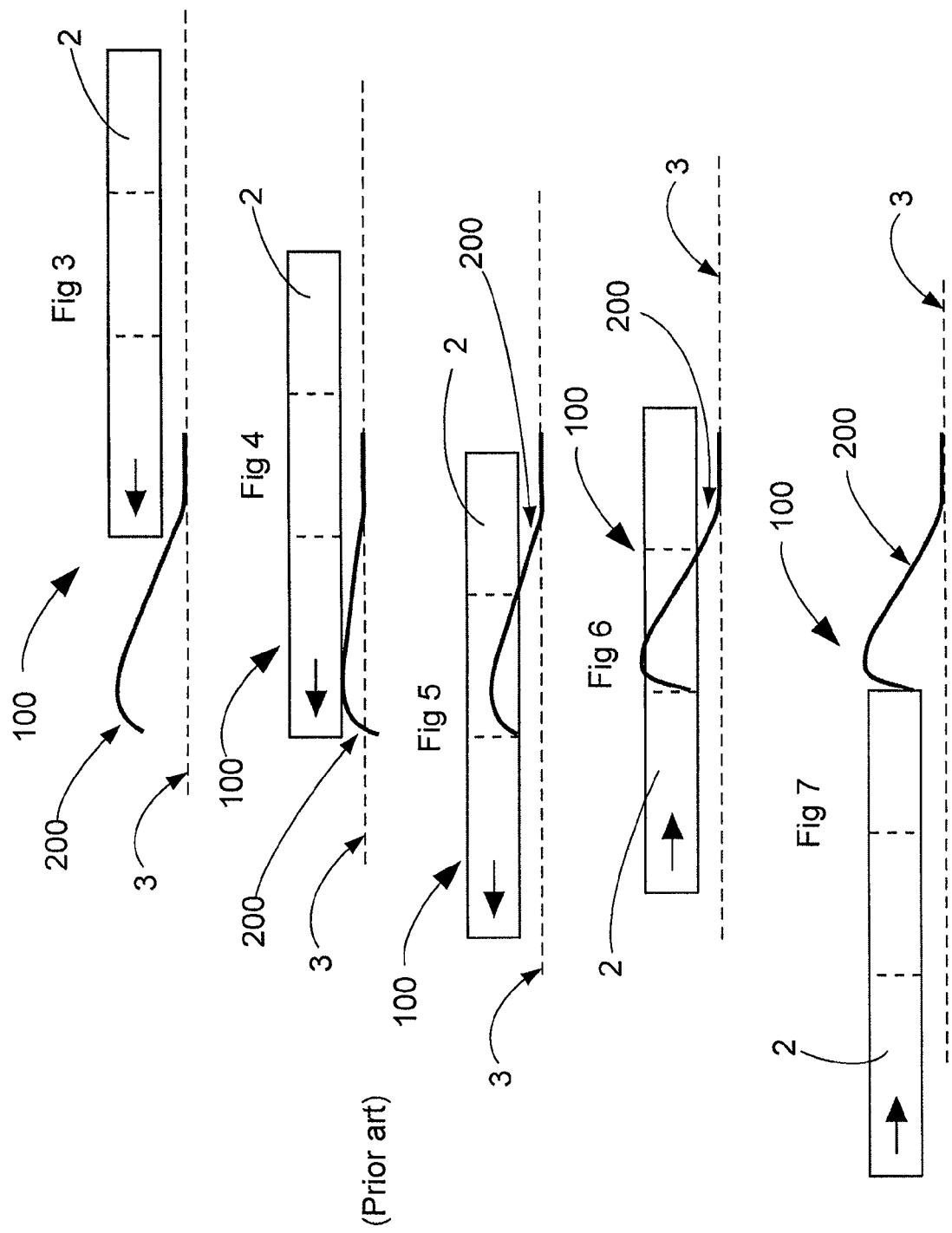

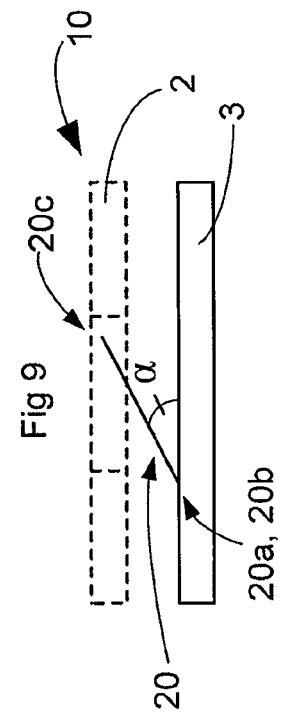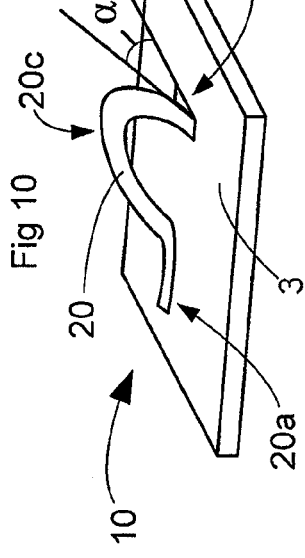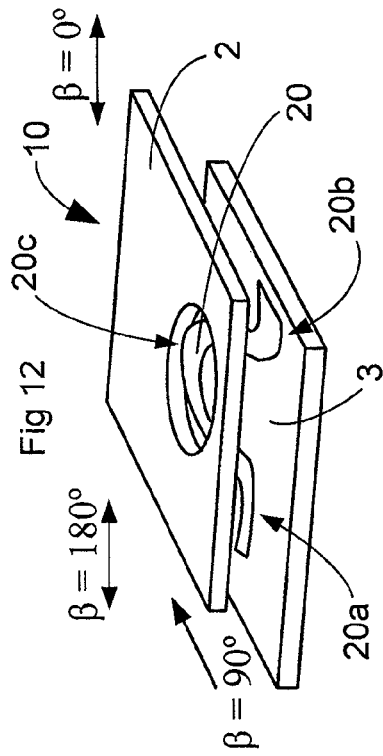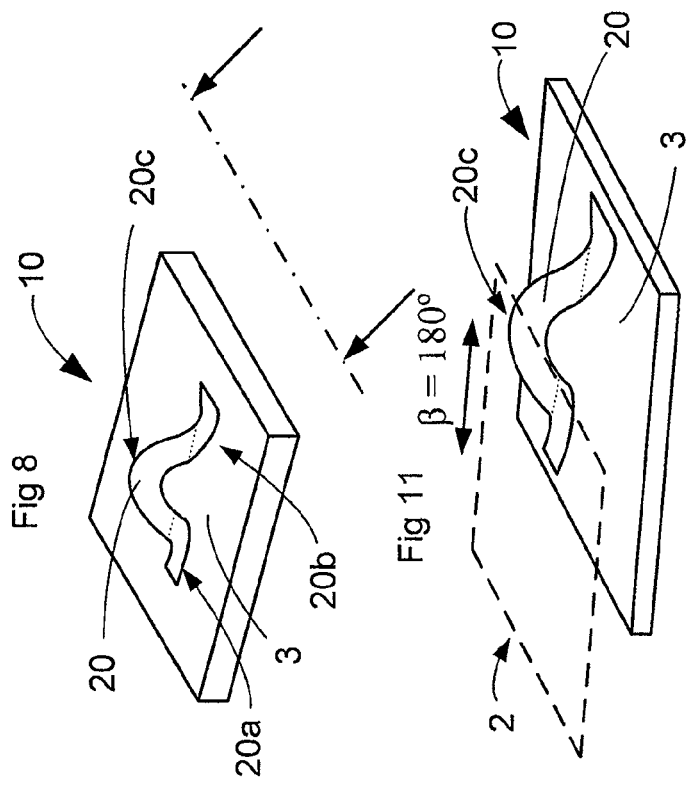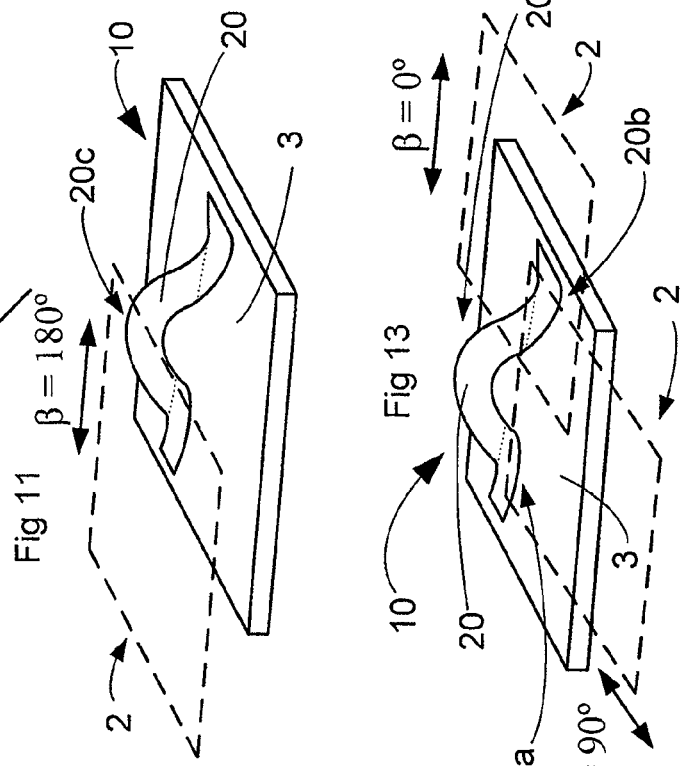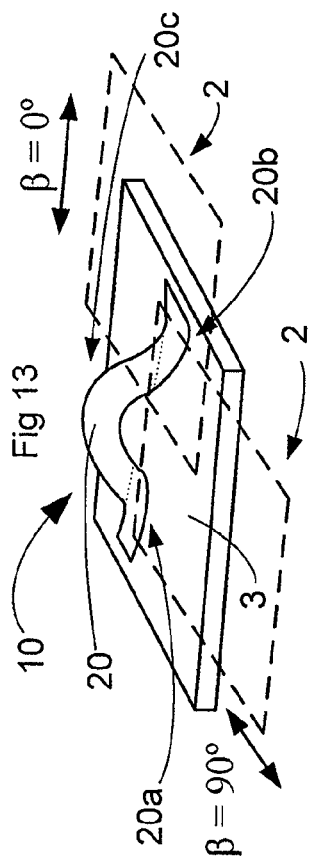

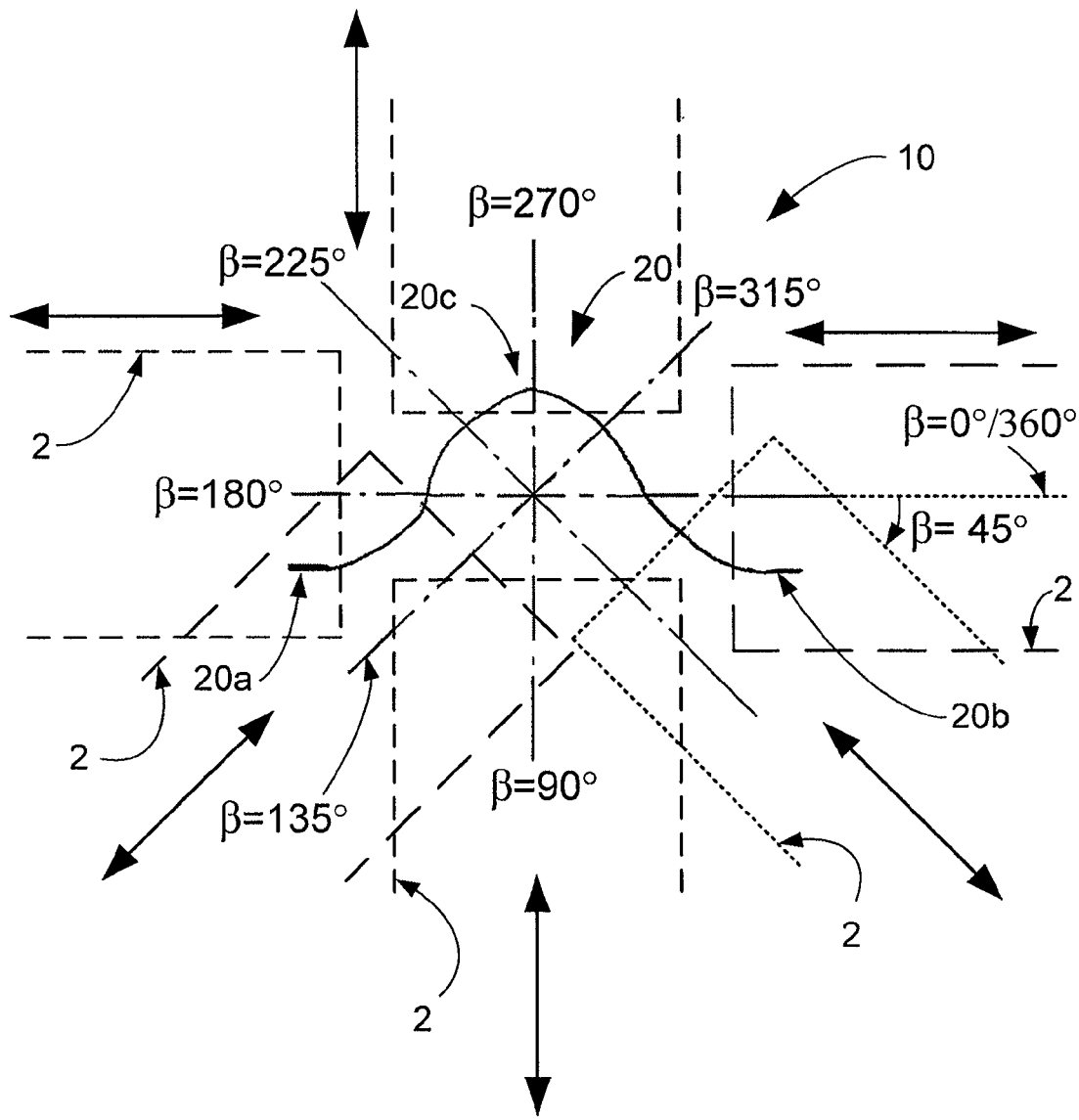

CONNECTOR DEVICE

TECHNICAL FIELD OF THE INVENTION

The present invention relates to a connector device for facilitating connection of smart cards in card readers, i.e. to improve the reliability when introducing and withdrawing the smart card into and from the card reader. The card connector may advantageously be used in a portable electronic device having such a card reader.

DESCRIPTION OF RELATED ART

Today, there exist various ways of facilitating the connection of external cards, e.g. smarts cards, such as SIM and memory cards used in portable electronic devices, and smart cards for cable or satellite set up boxes. Moreover, there exist differently shaped and sized smart cards for different portable electronic devices, such as mobile telephones, smart phones, lap tops, communicators, cameras, digital audio players (e.g. MP3-players or iPods®), electronic photo frames, cable and satellite set up boxes etc. These smart cards may be different types of SIM cards with or without holes or recesses, removable flash memory cards or the like. The smart cards are designed as externally removable and often thin cards that may be ejected from or introduced into the card reader of the electronic device by a controlled and biased eject/introduction function in a card reader to prevent users losing the card. Actuators for introducing or ejecting a smart card are known and may use push-push or push-pull ejectors and will not be explained in more detail.

The card readers are equipped with terminals in the form of contacts for electrical connection to the smart card to enable reading of the smart card. The contacts may be formed as contact legs being shaped or bent at a free end for achieving a biasing and flexible effect when the card is introduced in the card reader such that a reliable connection is accomplished by the card passing over the contact leg and pressing the contact leg into connection with the contacts of the card. Some cards may have a hole, e.g. a through hole, into which hole the contact leg is introduced by flexing into the hole when the card hole passes over the contact leg. The contact leg enables data in the card to be transferred to or from the electronic device easily. Known contact legs are curved and extend in a plane being perpendicular to the plane of the card reader.

Consequently, there are currently many different smart cards for the usage together with portable electronic devices, and cards often at least one uneveness, e.g. a dent with edges that may hook into edges of a card, and some cards even have holes, e.g. through holes, for different reasons. This may give rise to problems for a user, since the unevenness or hole may hook or get caught at the free end of the contact leg, whereby the contact leg is deformed and even destroyed so that it becomes inoperable. One way of trying to solve this problem is to elongate the length of the free end such that there is a lesser risk of hooking thereon, but this is not possible in low profile card readers as the available space, i.e. height is limited, and such an extended free end would hit the bottom of the card reader before the contact leg is fully deflected, whereby the smart card would not fit inside the card reader or the contact leg would be deformed to an undesired extent.

Hence, there is a need of reliable, simple and quick ways of introducing and/or withdrawing smart cards from a card reader. This is due to the fact that the size of the card readers, i.e. their height, must be as small as possible as the sizes of portable electronic devices decreases constantly, whereby the available height for contact legs inside the card reader decreases. The length of the protruding free end for known contact legs also involves an increased cost for the manufacturer of the portable electronic device as a certain additional volume of the device in general is dedicated for accommodating the height of the bent contact leg making the device larger than necessary. Furthermore, the user has to push the card with his finger and/or use a separate, loose tool, pin or pen to be able to "hit" the edge of the card when pushing the card to eject for withdrawal or to introduce it, which means that if the smart card is hooked onto the free end of the contact leg the card might get jammed inside the card reader or the card reader be made inoperable as the contact leg is deformed or destroyed requiring maintenance of the card reader or the user is forced to buy a new card reader. Moreover, this jamming of the smart card may urge the user to use too much force when trying to introduce or withdraw the card, whereby the card and/or the card reader may be damaged or the separate tool for pushing the card may not be useful or may even be destroyed. Yet further, when a portable electronic device is to be equipped with a card reader, the handling and size of the portable electronic device are compromised as known contact legs, due their shape, require a certain height inside the card reader that is not suitable for low profile card readers.

SUMMARY OF THE INVENTION

It has therefore, with the above and the following description in mind, and in view of an aspect of the present invention to provide an improved device, which seeks to mitigate, alleviate or eliminate one or more of the above-identified deficiencies in the art and disadvantages singly or in any combination.

The present invention is defined by the appended independent claims. Various advantageous aspects of the invention are set forth by the appended dependent claims as well as by the following description and the accompanying drawings.

One aspect of the present invention relates to a card connector for a smart card used in a portable electronic device comprising a card reader with a resilient card connecting device for operative connection of the smart card to the card reader by introducing the smart card into the card reader or disconnection of the smart card from the card reader by withdrawing the smart card from the card reader by moving the smart card in a plane being substantially in parallel with the plane of the card reader, wherein the card connecting device is extending substantially along a plane being inclined in relation to the plane of the card reader at an angle α, wherein the angle α is not 90°. In this way, an obliquely pointing and protruding card connecting device is formed.

An aspect relates to a card connector comprising a card connecting device being curved between its ends substantially along its inclined plane.

Another aspect relating to a card connector comprising a card reader and a card connecting device, the card connecting device extends substantially along a plane being inclined in relation to the plane of the card reader at an angle α between 5° and 85°.

An aspect relates to a card connector comprising a card reader and a card connecting device, the card connecting device extends substantially along a plane being inclined in relation to the plane of the card reader at an angle α between 15° and 70°.

Another aspect relates to a card connector comprising a card reader and a card connecting device, the card connecting device extends substantially along a plane being inclined in relation to the plane of the card reader at an angle α between 30° and 50°.

An aspect relates to a card connector comprising a card reader and a card connecting device, the card connecting device extends substantially along a plane being inclined in relation to the plane of the card reader at an angle α, wherein angle α is approximately 45°.

Another aspect relates to a card connector comprising a card connecting device, wherein the card connecting device is a strip or a wire.

An aspect relates to a card connector comprising a card reader and a card connecting device, the card connecting device extending substantially along a plane being inclined in relation to the plane of the card reader, wherein the inclined portion of the card connecting device is substantially U-shaped with its two ends forming the legs of the U.

Another aspect of the present invention relates to a card connector which comprises a card reader and a card connecting device having two ends. In one aspect, at least one end is fixed to the card reader for operative or electrical connection between the card reader and the smart card. In another aspect, each end is fixed to the card reader for operative or electrical connection between the card reader and the smart card.

An aspect relates to a card connector for a smart card used in a portable electronic device comprising a card reader with a resilient card connecting device for operative connection of the smart card by introducing the smart card into the card reader or disconnection of the smart card from the card reader by withdrawing the smart card from the card reader, which card connecting device has a shape enabling the smart card to pass by the connecting device in at least one other direction being oblique in relation to anyone of the introduction or withdrawal directions.

An aspect relates to a card connector as recited above, wherein the introduction and withdrawal directions are oblique in relation to each other. In one aspect, the introduction and withdrawal directions are two opposite directions. In another aspect, the introduction and withdrawal directions are two directions being perpendicular in relation to each other.

Another aspect relates to a card connector as recited above, wherein the least one other direction is perpendicular to any of the introduction or withdrawal direction.

An aspect relates to a card connector as recited above, wherein the resilient card connecting device is curved between its ends such that the smart card can pass the card connecting device in the at least one other direction forming an angle β in relation to anyone of the introduction or withdrawal directions defining the x- or y-axis, respectively, in a system of co-ordinates laid out in a plane of projection being in parallel with the plane of the reader, wherein the angle β is between 0° and 360° in the system of co-ordinates of the plane of projection. In another aspect, the angle β is between 0° and 315° in the system of co-ordinates. In another aspect, the angle β is 0°, 45°, 90°, 135°, 180°, 225°, 270° or 315° in the system of co-ordinates or any angle between these.

An aspect relates to a card connector as recited above, wherein the curved and inclined portion of the resilient card connecting device is substantially horseshoe-shaped forming a smart card terminal contacting part.

An aspect relates to a card connector as recited above, wherein the upper protruding part of the curved and inclined portion of the card connecting device is at least partly bent downwards towards the card reader to form a soft nose-shape facing a smart card being introduced into the card reader at a direction against the pointing direction of the card connecting device.

An aspect relates to a portable electronic device, wherein the card connector is intended for the usage together with the portable electronic device, wherein the portable electronic device is a device from the group comprising: a mobile radio terminal, a mobile telephone, a cellular telephone, a pager, a communicator, a smart phone, a Personal Digital Assistant (PDA), an electronic organizer, a computer, a digital audio player, a digital camera, a cable or satellite set up box.

Another aspect, a portable electronic device comprises a memory card being adapted to be ejected from or loaded into a card connector according to the invention.

Thus, the card connector according to the invention can serve as a smart built-in-device having two functions, i.e. being able to facilitate the ejection of the smart card from the card reader and/or to facilitate the introduction of the same into 10 the card reader when moved in and out of the card reader in any direction. It is an advantage with the invention that the risk of jamming the smart card in the card reader is eliminated. Moreover, another advantage is that the connecting device, i.e. the contact legs for electrical connection are more durable as there is no risk of the ends of the contact legs getting stuck or hooking onto parts of the smart card, e.g. the ends or edges of the smart card or the ends of cavities or holes in the smart card independently of which direction the smart card is moved when withdrawn from or introduced into the card reader. Thus, also the total cost for manufacturing and handling the device using such a card connector may be reduced. Furthermore, the risk for breaking or deforming the contact legs of the card reader due to jamming between its ends and the smart card is eliminated. This also means that the card connector according to the invention enables a more reliable connection between the connecting device and the smart card and a longer life time for the card connector. Furthermore, the invention may be applied in several various products, devices and versions making a more flexible usage and broader application of the invention.

BRIEF DESCRIPTION OF THE DRAWINGS

Further objects, features and advantages of the invention will appear from the following detailed description of the invention, wherein the invention will be described in more detail with reference to the accompanying drawings, in which:

FIGS. 3 to 7 show side views of known card connectors when a smart card is introduced into and withdrawn from a card reader of the card connector;

FIG. 8 shows a perspective view of the card connector according to the invention with a card connecting device and a card reader;

FIG. 9 shows a side view of the card connector according to the invention when viewed in the direction of arrows in FIG. 8 with the card connecting device inclined at an angle α;

FIG. 10 shows another perspective view of the card connector in FIGS. 8 and 9;

FIG. 11 shows still another perspective view of the card connector in FIGS. 8 to 10 when a smart card shown with dashed lines is introduced into or withdrawn from the card reader in two opposite directions;

FIG. 12 shows yet another perspective view of the card connector in FIGS. 8 to 11 when a smart card with a hole (shown with continuous lines) is or has been introduced into the card reader in at least one of three different directions;

FIG. 13 shows another perspective view of the card connector in FIGS. 8 to 12 when smart cards shown with dashed lines are introduced into or withdrawn from the card reader in at least one of four different directions.

FIG. 16 schematically shows a plane of projection of the card connector in FIGS. 8 to 15 when projected down from above into a system of co-ordinates in the plane of the card reader with the connecting device shown with continuous lines as a curve and the smart cards shown as squares with dashed lines when introduced into or withdrawn from the card reader in at least ten different directions shown by straight arrows and in at least five different angles in relation to the horizontal axis.

DETAILED DESCRIPTION OF EMBODIMENTS

An aspect of the present invention will be described more fully hereinafter with reference to the accompanying drawings. FIGS. 1-2 and 8 to 14 show different views of the card connector 10 according to the invention while FIGS. 3 to 7 show different views of known card connectors when introducing and withdrawing smart cards therefrom. This invention as shown in FIGS. 1-2 and 8 to 14 may, however, be realized in many different forms, shapes and structures and should not be construed as limited to the aspects set forth herein. Rather, these aspects are discussed so that this disclosure will be thorough and complete, and will fully convey the scope of the invention to those skilled in the art. Like numbers refer to like elements throughout.

Figure 1:
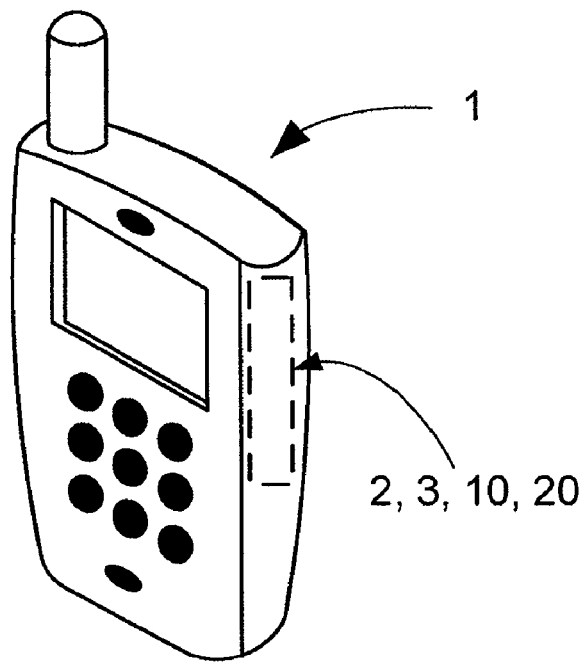
FIG. 1 shows a portable electronic device with a card connector according to the invention.
Figure 2:
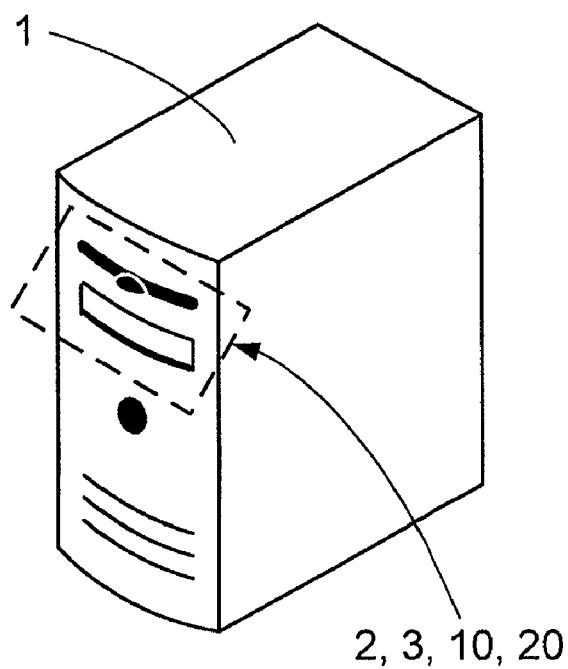
FIG. 2 shows a stationary electronic device with a card connector according to the invention.

The card connector 10 according to the disclosed invention is preferably, but not necessarily, intended for the usage together with a portable electronic device 1 (see FIG. 1) adapted to use a memory card or a smart card 2, which may be introduced into or withdrawn from a card reader or holder 3 in a known way, wherefore this function will not be explained in detail. The portable electronic device 1 may be any portable electronic device such as, e.g., a mobile radio terminal, a mobile telephone, a cellular telephone, a pager, a communicator, a smart phone, a Personal Digital Assistant (PDA), an electronic organizer, a portable computer, a digital audio player such as a MP3-player or an iPod®, a digital camera, an electronic picture frame, a television receiver, A Home cinema, or any other suitable picture or movie projector, or a cable or satellite set up box. The electronic device 1 may also be a stationary computer 1 as shown in FIG. 2.

Figure 14:
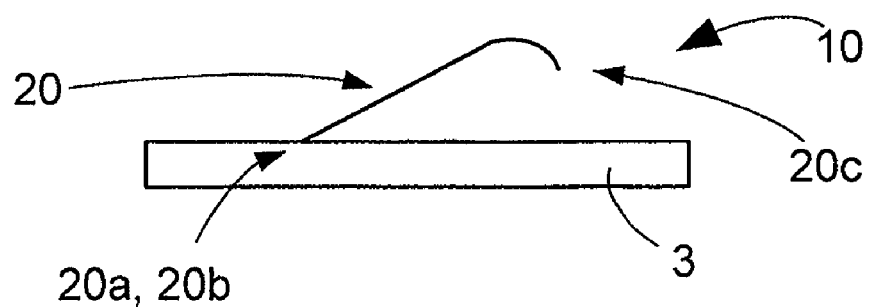
FIG. 14 shows a side view of the card connector in FIGS. 8 to 13 when viewed in the direction of the arrows in FIG. 8.

The prior art card connectors 100 shown in FIGS. 3 to 7 has a prior art connecting device 200 in the form of at least one prior art contact leg with a free end that easily get stuck or jammed against the smart card 2 when the smart card is introduced into or withdrawn from the card reader 3 by hooking onto an edge of the smart card 2, e.g. an inner edge of a cavity or hole in the smart card as shown in FIG. 6 or an outer edge of the smart card as shown in FIG. 7. The free end of the prior art contact leg protrudes perpendicularly in relation to the plane of the card reader, i.e. the prior art contact leg extends at an angle α of 90° from the card reader 3 in a plane being perpendicular in relation to the card reader plane (compare with FIGS. 9 and 10 showing the invention). The smart card 2 is introduced into the card reader 3 from a first direction and a first side as shown in steps in FIGS. 3 to 5 and introduced from a second direction, i.e. another direction opposite the first direction, and a second side as shown in FIG. 7 (see also FIGS. 11-13 showing the invention). The first and the second sides are defined by help of an angle β being 0° for the first side (β=0°) and 180° for the second opposite side (β=180°) as shown in FIGS. 12-14 showing the invention. In FIG. 5, the free end of the prior art contact leg is arranged inside the smart card hole after the smart card has been introduced into the card reader from the first direction and the first side (β=0°). This arrangement is a problem for these prior art contact legs as the free end get stuck against the inner edge of the smart card hole when the smart card is withdrawn in the second direction being opposite the first direction towards the first side as shown in FIG. 6 and jams the smart card inside the card reader. The same problem occurs if the smart card is introduced in the second direction being opposite the first direction from the second opposite side (β=180°) as the free end of the prior art contact leg hits the outer edge of the smart card and hinders the smart card from being introduced into the card reader. This problem means that the contact leg hinders the disconnection or connection of the smart card and also means that the contact leg 20 may be deformed if a too large force is used to push or pull the smart card when jammed. This may also break the card reader and associated components.

The card connector 10 shown in FIGS. 8 to 14 comprises connecting device 20 in the form of a single elongated curved body 20 with ends fixed to the card reader 3, i.e. a first end 20a and a second end 20b, in the electronic device 1. The card connector 10 is operatively connected to the portable electronic device 1 in a known way and will not be explained in detail.

Figure 15:
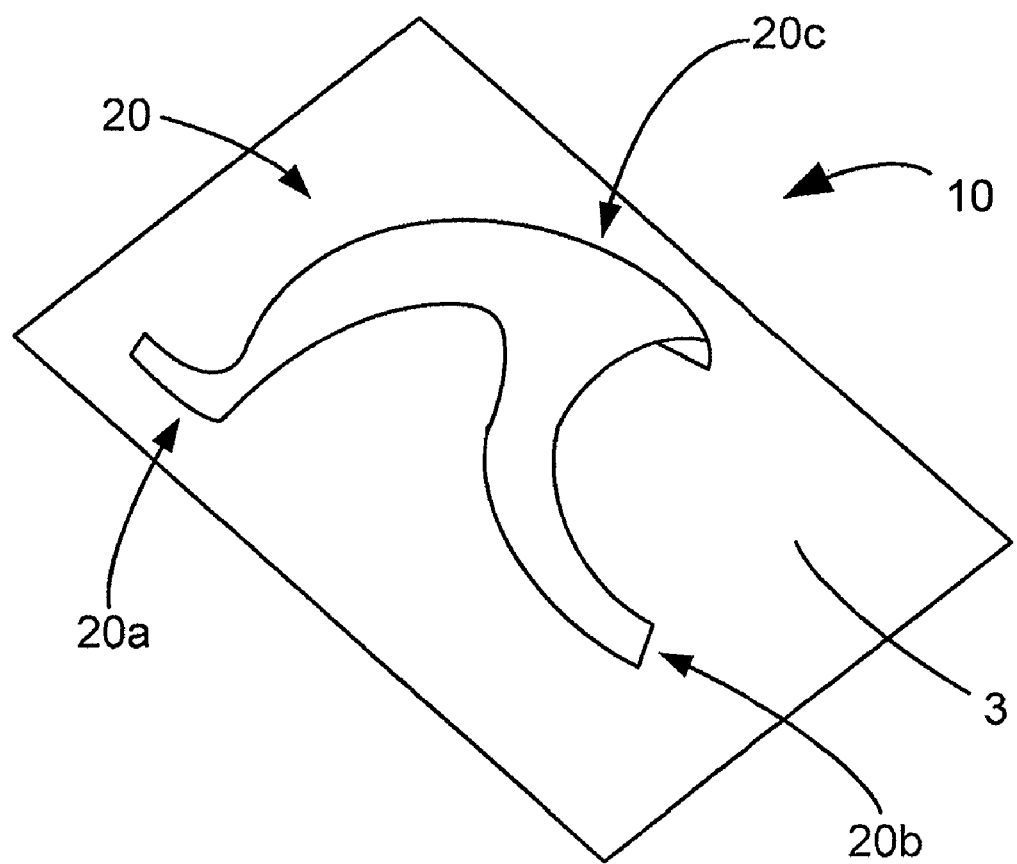
FIG. 15 shows a perspective view of the card connector in FIG. 14.

As shown in FIGS. 8 to 16, the card connecting device 20 also has one part or portion 20c forming a free tip or bend for interaction with the smart card 2 by being adapted to contact the smart card, such that a user of the electronic device can introduce or eject, i.e. withdraw, the card by pushing or pulling and moving the card in at least two directions for passing the connecting device bend 20c. As shown in FIGS. 14 and 15, the upper protruding part 20c of the curved and inclined portion of the card connecting device may, as an alternative, be at least partly bent downwards towards the card reader 3. The advantage of this bent overhang-like part 20c is that it forms a soft nose-shape facing a smart card that is introduced into the card reader 3 at a direction against the pointing direction of the card connecting device, e.g. in the direction of 270° as shown in FIG. 16, which rounded shape eliminates the risk of the connecting device and the card hooking into each other. Alternatively, the protruding length of the downwardly extending free part of the bent part 20c may be shorter or longer than shown. The bent part 20c may as an alternative end in a free end above the card reader plane or, alternatively, have a free end ending at the substantially same plane as the card reader. In another alternative, the extending bent part 20c may end in an end that is fixed to the card reader. In this alternative, at least two or even three of the ends 20a, 20b, 20c may be fixed to the card reader.

The card connector 10 according to the invention the smart card 2 is used for operative connection to the card reader 3 by introducing the smart card into the card reader or disconnection of the smart card from the card reader by withdrawing the smart card from the card reader by moving the smart card in a plane being substantially in parallel with the plane of the card reader as shown in FIGS. 9, and 11 to 16, wherein the card connecting device is extending substantially along a plane 20 being inclined in relation to the plane of the card reader at the angle α shown in FIGS. 9 and 10, wherein the angle α is not 90°. The ends 20a and 20b of the resilient card connecting device 20 may extend substantially in the direction of introduction or withdrawal as shown in FIGS. 11 to 16, but, may alternatively and independently of each other extend in any other suitable oblique direction in relation to the first direction and first side of the card connector 10 defined with angle β=0° and/or the second direction and second side of the card connector defined with angle β=180°.

The inclined card connecting device 20 according to the invention enables the smart card to always slide over the connecting device when moved into or out of contact with the connecting device as the contacting surfaces and edges of the connecting device and the smart card always meet at angle in relation to each other. Moreover, by inclining the connecting device 20 at an angle α that never is perpendicular to the plane of the card reader, the connecting device can be bent or moved to the side in the direction of its inclination, i.e. to the right in FIGS. 9, 14, and 15, whereby a springing effect in at least two directions and planes are achieved, i.e. downwards towards the plane of the card reader and to the side.

The card connecting device 20 may be curved between its ends 20a, 20b substantially along its inclined plane. Alternatively, the end 20c of the card connecting device 20 may be curved or bent such that it protrudes in a direction out of its inclined plane towards the card reader 3, as shown in FIGS. 14 and 15. The inclination angle α of the card connector may be between 5° and 85°. Alternatively, angle α may be between 15° and 70° or, as another alternative, may be between 30° and 50°. The inclination angle α of the card connector may alternatively be approximately 45°.

The card connecting device 20 may be formed by a strip or alternatively by a wire. Moreover, the inclined portion 20c of the card connecting device 20 is substantially U-shaped with the two ends 20a, 20b forming the legs of the U, but may also be substantially horseshoe-shaped. The advantage of the shape of the connecting device 20 is that it has a rounded shape not obstructing the smart card when moving the card in contact with the bend 20c and pass the connecting device. Moreover, the connecting device shape is symmetrical in at least the first (β=0°) and the second direction (β=180°) meaning that it is equally easy to move the smart card pass the connecting device in any of these directions, and, alternatively, to move the smart card in any direction between β=0° and β=360°, i.e. in any direction in the quarters of the system of co-ordinates shown in FIG. 16.

Furthermore, due to the fact that the connecting device 20 extends with its bend 20c in a direction defined as β=90° or 270° and shown in FIG. 16, there is alternatively possibilities of moving the card 2 pass the connecting device in this direction and directions defined as β=45° and β=315°, and any direction therebetween in the system of co-ordinates shown in FIG. 16. This enables the inventive card connector 10 to allow the smart card 2 to be moved in directions being perpendicular and oblique in relation to each other (see the directions with β between 0° or 360° and 270° in FIG. 16). Furthermore, the card connector 10 may allow the smart card 2 to be moved in other directions with β larger than 180°, e.g. β=215° or β=335°, even though directions with β less than 180° are preferred for a more reliable non-jamming function.

In the aspects shown in FIGS. 8 to 16, the card connector 10 is formed as a strip with a substantially thin form and constant width, but, may have a varying shape lengthwise, e.g. a varying width and/or thickness. Alternatively, if the card connector is formed as a wire with a substantially cylindrical form and constant diameter, it may instead have a varying shape lengthwise, e.g. a varying cross-section and/or diameter. Moreover, the fixed ends 20a and 20b may be flat and thin while the shape between the ends has round, oval or other cross-section. The flexibility of the card connector 10 can be controlled by choosing different physical properties, dimensions, and material when designing the card connecting device 20. A smaller diameter at the ends 20a, 20b is one way of achieving flexibility in the card connector 10. This varying shape may also be achieved (not shown) by making a continuous thickness and/or diameter variation, e.g. a conical shape. Another way is to make the card connector 10 of a flexible or elastic material, e.g. a suitable metal, or other electrical conductive material. The card actuator 10 could be formed as a spring (not shown), e.g. a coiled spring in that the elongated body of the card connecting device 20 may be coiled lengthwise with a substantially helical shape. In this form, the card connector may be bendable but sufficiently stiff such that the connecting device 20 does not deform or bend when the smart card 2 is in contact therewith. The card connector 10 may be made of a metal suitable for this coiled form.

The card reader 20 may comprise an integrated card eject mechanism being adapted for enabling easy ejection of the smart card from the card reader. The function of the card reader and the card eject mechanism are known technology and will not be explained in more detail. The card reader may also have a lid for closing and opening the card reader in a known way for introduction or removal of the smart card. The card eject mechanism may of course also be used for loading, i.e. introducing the memory card into the card reader in a known way, and this function will also not be explained in more detail. Moreover, the card reader 3 is placed on one long side edge of the electronic device 1 as shown in FIG. 1 or on the front of the stationary computer in FIG. 2, but may of course be arranged at other any suitable location on and/or in the electronic device as long as easy access to the card reader 3 is enabled, e.g. on the opposite long side edge, on a short side, at the back or front of the electronic device, etc.

The present invention has been described above with reference to a specific embodiment. Many modifications can be made by a person skilled in the art. The embodiment described above is merely an illustrative example and the invention can be modified and used together with many different products, not only portable electronic devices as indicated in the detailed description. The different features of the invention can be combined in other combinations than those described. The invention is only limited by the appended claims

What is claimed is:

1. A card connector for a smart card, used in a portable electronic device comprising a card reader with a resilient card connecting device, for operative connection of the smart card to the card reader by introducing the smart card into the card reader or disconnection of the smart card from the card reader by withdrawing the smart card from the card reader by moving the smart card in a plane being substantially in parallel with the plane of the card reader, wherein the card connecting device is extending substantially along a plane being inclined in relation to the plane of the card reader at an angle α, wherein the angle α is neither 0° nor 90° and the card connecting device has two ends and is curved between the ends substantially along the incline plane, wherein the card connecting device never extends in a plane being perpendicular to or in parallel with the plane of the card reader and any plane of direction in which the smart card is introduced into or withdrawn from the card reader, whereby the contacting surfaces and edges of the connecting device and the smart card always meet at angle in relation to each other.

2. The card connector as recited in claim 1, wherein angle α is between 5° and 85°.

3. The card connector as recited in claim 2, wherein angle α is between 15° and 70°.

4. The card connector as recited in claim 3, wherein angle α is between 30° and 50°.

5. The card connector as recited in claim 4, wherein angle α is approximately 45°.

6. The card connector as recited in claim 1, wherein the card connecting device is a strip or a wire.

7. The card connector as recited in claim 6, wherein the inclined portion of the card connecting device is substantially U-shaped with the two ends forming the legs of the U.

8. A card connector for a smart card, used in a portable electronic device comprising a card reader with a resilient card connecting device, for operative connection of the smart card by introducing the smart card into the card reader or disconnection of the smart card from the card reader by withdrawing the smart card from the card reader, in which the card connecting device has a shape enabling the smart card to pass by the connecting device in at least one other direction being oblique in relation to any of the introduction or withdrawal directions, wherein the card connecting device has two ends and extends substantially along a plane being inclined in relation to the plane of the card reader and is curved between the ends substantially along the inclined plane, wherein the card connecting device never extends in a plane being perpendicular to or in parallel with the plane of the card reader and any plane of direction in which the smart card is introduced into or withdrawn from the card reader, whereby the contacting surfaces and edges of the connecting device and the smart card always meet at angle in relation to each other.

9. The card connector as recited in claim 8, wherein the introduction and withdrawal directions are oblique in relation to each other or the introduction and withdrawal directions are two opposite directions or two directions being perpendicular to each other.

10. The card connector as recited in claim 1, wherein the resilient card connecting device has two ends, each end being fixed to the card reader for operative connection between the card reader and the smart card.

11. The card connector as recited in claim 2, wherein the resilient card connecting device has two ends, each end being fixed to the card reader for operative connection between the card reader and the smart card.

12. The card connector as recited in claim 1, wherein the card connecting device extends obliquely and has an upper part at its curved and inclined portion, which upper part is at least partially bent downwards towards the card reader to form a soft nose-shape facing a smart card being introduced into the card reader at a direction against the extension direction of the card connecting device.

13. The portable electronic device as recited in claim 1, wherein the card connector is intended for the usage together with the portable electronic device, wherein the portable electronic device is a device from the group comprising: a mobile radio terminal, a mobile telephone, a cellular telephone, a pager, a communicator, a smart phone, a Personal Digital Assistant (PDA), an electronic organizer, a computer, a digital audio player, a digital camera, a cable or satellite set up box.

* * * * *